(12) United States Patent
Hays

(10) Patent No.: US 10,612,953 B2
(45) Date of Patent: Apr. 7, 2020

(54) VIBRATORY FLOWMETER AND METHOD FOR AVERAGE FLOW RATE

(75) Inventor: Paul J Hays, Lafayette, CO (US)

(73) Assignee: Micro Motion, Inc., Boulder, CO (US)

( * ) Notice: Subject to any disclaimer, the term of this patent is extended or adjusted under 35 U.S.C. 154(b) by 1137 days.

(21) Appl. No.: 14/241,949

(22) PCT Filed: Sep. 19, 2011

(86) PCT No.: PCT/US2011/052106
§ 371 (c)(1),
(2), (4) Date: Feb. 28, 2014

(87) PCT Pub. No.: WO2013/043147
PCT Pub. Date: Mar. 28, 2013

(65) Prior Publication Data
US 2014/0208871 A1   Jul. 31, 2014

(51) Int. Cl.
*G01F 1/84* (2006.01)
*G01F 1/72* (2006.01)

(52) U.S. Cl.
CPC ............. *G01F 1/8418* (2013.01); *G01F 1/72* (2013.01); *G01F 1/8431* (2013.01); *G01F 1/8436* (2013.01); *G01F 1/8477* (2013.01)

(58) Field of Classification Search
CPC ................................. G01F 1/8418; G01F 1/72
See application file for complete search history.

(56) References Cited

U.S. PATENT DOCUMENTS

| 4,011,757 A | 3/1977 | Baatz |
| 4,171,638 A | 10/1979 | Coman et al. |
| 4,187,721 A * | 2/1980 | Smith .................. G01F 1/8413 73/32 A |
| 4,449,397 A | 5/1984 | Lauterbach |
| 4,555,937 A | 12/1985 | Sumal |
| 5,734,112 A * | 3/1998 | Bose .................... G01F 1/8413 73/861.56 |
| 5,969,264 A | 10/1999 | Rivkin |
| 6,556,929 B1 | 4/2003 | Kleinhans et al. |
| 2011/0011186 A1 | 1/2011 | Miyaji et al. |

FOREIGN PATENT DOCUMENTS

| DE | 19653184 A1 * | 7/1998 | ............... G01F 1/60 |
| JP | 06337722 A | 6/1994 | |
| WO | 9807009 A1 | 2/1998 | |
| WO | 9917084 A1 | 4/1999 | |

* cited by examiner

Primary Examiner — Jennifer E Simmons
(74) Attorney, Agent, or Firm — The Ollila Law Group LLC

(57) ABSTRACT

A vibratory flowmeter (5) for determining an average flow rate of a pulsating flow is provided. The vibratory flowmeter (5) includes a flowmeter assembly (10) including at least two pickoff sensors (170L, 170R) and configured to generate at least two vibrational signals and meter electronics (20) configured to receive the at least two vibrational signals and generate a flow rate measurement signal, divide the flow rate measurement signal into a series of time periods, with each time period including a single flow peak that is substantially centered in the time period, totalize flow rate measurements of each time period to generate a period sum, and divide the period sum by a time period length to generate a period average flow rate, wherein the meter electronics (20) outputs a sequence of period average flow rates as an average flow rate signal.

20 Claims, 5 Drawing Sheets

VIBRATORY FLOWMETER AND METHOD FOR AVERAGE FLOW RATE

BACKGROUND OF THE INVENTION

1. Field of the Invention

The present invention relates to a vibratory flowmeter and method, and more particularly, to a vibratory flowmeter and method for determining an average flow rate.

2. Statement of the Problem

Vibrating conduit sensors, such as Coriolis mass flowmeters and vibrating densitometers, typically operate by detecting motion of a vibrating conduit that contains a flowing material. Properties associated with the material in the conduit, such as mass flow, density and the like, can be determined by processing measurement signals received from motion transducers associated with the conduit. The vibration modes of the vibrating material-filled system generally are affected by the combined mass, stiffness, and damping characteristics of the containing conduit and the material contained therein.

A typical Coriolis mass flowmeter includes one or more conduits that are connected inline in a pipeline or other transport system and convey material, e.g., fluids, slurries, emulsions, and the like, in the system. Each conduit may be viewed as having a set of natural vibration modes, including for example, simple bending, torsional, radial, and coupled modes. In a typical Coriolis mass flow measurement application, a conduit is excited in one or more vibration modes as a material flows through the conduit, and motion of the conduit is measured at points spaced along the conduit. Excitation is typically provided by an actuator, e.g., an electromechanical device, such as a voice coil-type driver, that perturbs the conduit in a periodic fashion. Mass flow rate may be determined by measuring time delay or phase differences between motions at the transducer locations. Two such transducers (or pickoff sensors) are typically employed in order to measure a vibrational response of the flow conduit or conduits, and are typically located at positions upstream and downstream of the actuator. The two pickoff sensors are connected to electronic instrumentation. The instrumentation receives signals from the two pickoff sensors and processes the signals in order to derive a mass flow rate measurement, among other things. Vibratory flowmeters, including Coriolis mass flowmeters and densitometers, therefore employ one or more flow tubes that are vibrated in order to measure a fluid.

It is often desired to measure a flow rate of a flowing fluid. Where the fluid is flowing steadily, such flow rate measurement is straightforward. But where the flow is pulsating, such as in a pumped flow, then a flow rate measurement may reflect the periodic nature of the pulsating flow, with the flow rate measurement varying in amplitude, in time with the flow.

Many types of pumps will output a flow that is significantly periodic and consequently the flow will pulsate according to a period (or operational speed) of the pump. For example, the Texsteam 5000 series short stroke, chemical injection pump has a stroke rate as low as five strokes per minute with a ten percent "ON" duty cycle.

It is often desired that a flow rate measurement of a pulsating flow comprise an average flow rate measurement instead of an instantaneous flow rate measurement. It is often desired that the flow rate measurement comprise a substantially steady and representative flow rate measurement value. It is often desired that the flow rate measurement not vary periodically. A flowmeter user may not want, or be able to use, an instantaneous flow rate measurement.

One complicating factor in generating an average flow rate measurement for a pulsating flow is that a pulsating flow may have a periodic reverse flow. Another complicating factor is that users desire an average flow rate measurement that has a quick update rate and does not noticeably or appreciably lag the actual flow. Further, an average flow rate measurement may be complicated where the period between pulses is changing.

One prior art solution to measuring the flow rate of a pulsating flow has been to utilized flow damping. The flow damping comprises a software filtering (typically using an infinite impulse response (IIR) or finite impulse response (FIR) filter having a fixed number of filter coefficients). The filtering will smooth the instantaneous flow rate output, but is generic and non-adaptive to pulsating flow periods. The flow damping may operate to damp a periodic flow peak, wherein periodicity is somewhat reduced by flattening out and widening the flow peaks. The flow damping may operate to eliminate or reduce incidents of negative or reverse flow.

However, such damping includes drawbacks. One drawback is that such damping may create an average flow rate that has significant variation. A varying average flow rate may result because the flow damping is non-adaptive to the pulsating flow periods. Another drawback is that although the damping may decrease the average flow rate variation, doing so delays the average flow rate measurement by significantly more than the one period which can be achieved according to the vibratory flowmeter and method discussed herein.

ASPECTS OF THE INVENTION

In one aspect of the invention, a vibratory flowmeter for determining an average flow rate of a pulsating flow comprises:
- a flowmeter assembly including at least two pickoff sensors and configured to generate at least two vibrational signals; and
- meter electronics configured to receive the at least two vibrational signals and generate a flow rate measurement signal, divide the flow rate measurement signal into a series of time periods, with each time period including a single flow peak that is substantially centered in the time period, totalize flow rate measurements of each time period to generate a period sum, and divide the period sum by a time period length to generate a period average flow rate, wherein the meter electronics outputs a sequence of period average flow rates as an average flow rate signal.

Preferably, the average flow rate signal comprises an average mass flow rate signal.

Preferably, the average flow rate signal comprises an average volumetric flow rate signal.

Preferably, the time period length is substantially fixed.

Preferably, the time period length is adaptive.

Preferably, the meter electronics is configured to determine periodicity in the flow rate measurement signal.

Preferably, the meter electronics is configured to determine periodicity in the flow rate measurement signal, wherein the periodicity is determined by performing a discrete Fourier transform (DFT) on the flow rate measurement signal.

Preferably, the meter electronics is configured to determine periodicity in the flow rate measurement signal, wherein the periodicity is determined by scanning for peaks in the flow rate measurement signal.

Preferably, the meter electronics is configured to determine periodicity in the flow rate measurement signal, wherein the periodicity is determined by scanning for peaks in the flow rate measurement signal, with the scanning comprising the meter electronics comparing flow artifacts in the flow rate measurement signal to one or more of a predetermined peak amplitude threshold, a predetermined peak width threshold, or a predetermined minimum peak spacing threshold.

Preferably, the meter electronics is configured to determine periodicity in the flow rate measurement signal, wherein the periodicity is determined by performing a windowing analysis on the flow rate measurement signal.

In one aspect of the invention, a method for determining an average flow rate of a pulsating flow comprises:
- receiving two or more vibrational response signals from two or more pickoff sensors of a vibratory flowmeter and generating a flow rate measurement signal;
- dividing the flow rate measurement signal into a series of time periods, with each time period including a single flow peak that is substantially centered in the time period;
- totalizing flow rate measurements of each time period to generate a period sum; and
- dividing the period sum by a time period length to generate a period average flow rate, wherein a sequence of period average flow rates is outputted as an average flow rate signal.

Preferably, the average flow rate signal comprises an average mass flow rate signal.

Preferably, the average flow rate signal comprises an average volumetric flow rate signal.

Preferably, the time period length is substantially fixed.

Preferably, the time period length is adaptive.

Preferably, dividing the flow rate measurement signal into a series of time periods comprises determining periodicity in the flow rate measurement signal.

Preferably, dividing the flow rate measurement signal into a series of time periods comprises determining periodicity in the flow rate measurement signal, wherein the periodicity is determined by performing a discrete Fourier transform (DFT) on the flow rate measurement signal.

Preferably, dividing the flow rate measurement signal into a series of time periods comprises determining periodicity in the flow rate measurement signal, wherein the periodicity is determined by scanning for peaks in the flow rate measurement signal.

Preferably, dividing the flow rate measurement signal into a series of time periods comprises determining periodicity in the flow rate measurement signal, wherein the periodicity is determined by scanning for peaks in the flow rate measurement signal, with the scanning comprising comparing flow artifacts in the flow rate measurement signal to one or more of a predetermined peak amplitude threshold, a predetermined peak width threshold, or a predetermined minimum peak spacing threshold.

Preferably, dividing the flow rate measurement signal into a series of time periods comprises determining periodicity in the flow rate measurement signal, wherein the periodicity is determined by performing a windowing analysis on the flow rate measurement signal.

DESCRIPTION OF THE DRAWINGS

The same reference number represents the same element on all drawings. The drawings are not necessarily to scale.

DETAILED DESCRIPTION OF THE INVENTION

FIGS. 1-5 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
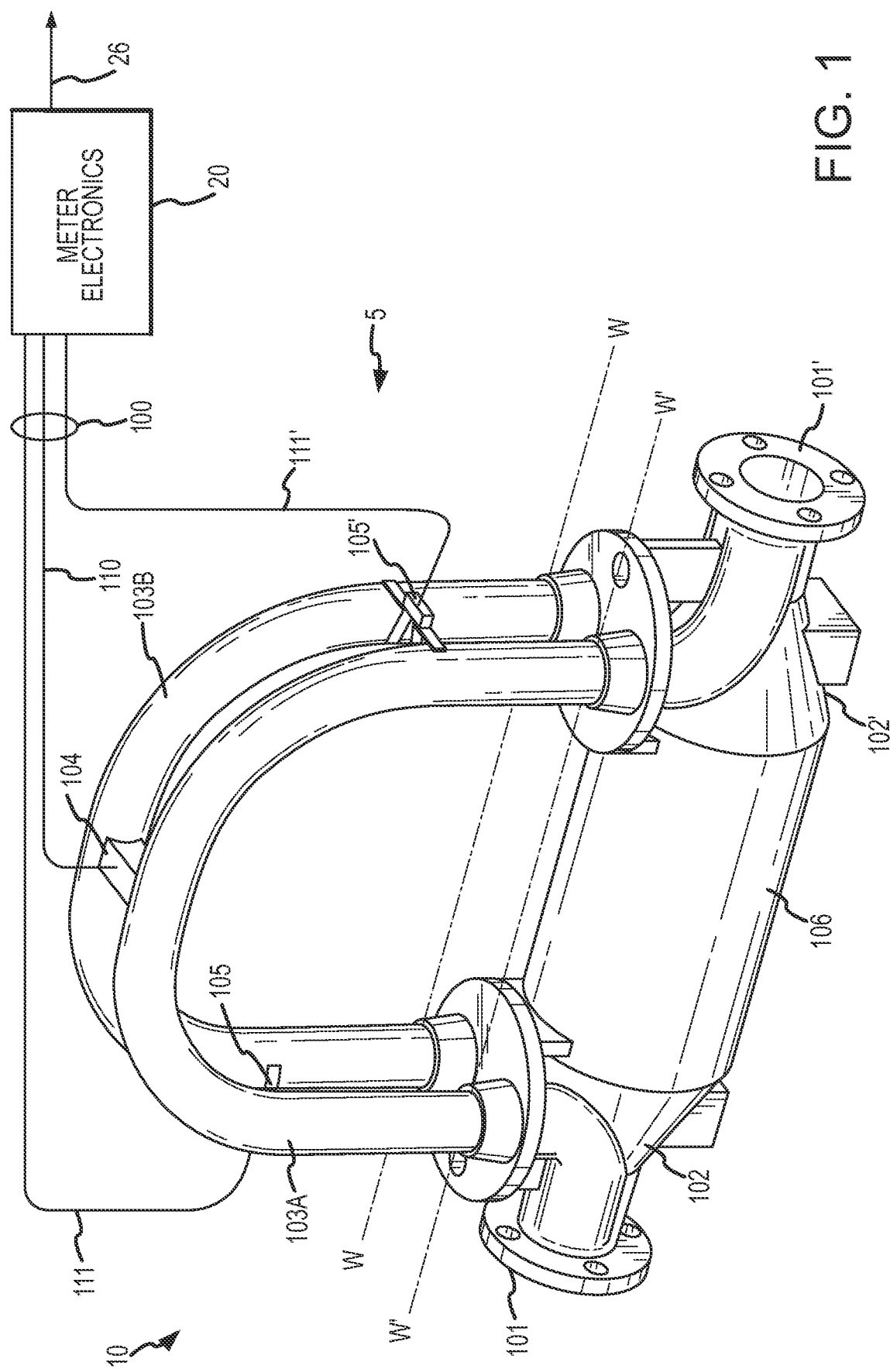
FIG. 1 shows a vibratory flowmeter according to the invention.

FIG. 1 shows a vibratory flowmeter 5 according to an embodiment of the invention. The vibratory flowmeter 5 comprises a flowmeter assembly 10 and meter electronics 20. The meter electronics 20 is connected to the meter assembly 10 via leads 100 and is configured to provide measurements of one or more of a density, mass flow rate, volume flow rate, totalized mass flow, temperature, or other measurements or information over a communication path 26. The vibratory flowmeter 5 can comprise a Coriolis flowmeter 5 in some embodiments. It should be apparent to those skilled in the art that the vibratory flowmeter can comprise any manner of vibratory flowmeter, regardless of the number of drivers, pick-off sensors, flow conduits, or the operating mode of vibration. In addition, it should be recognized that the vibratory flowmeter 5 can alternatively comprise a vibratory densitometer.

The flowmeter assembly 10 includes a pair of flanges 101 and 101', manifolds 102 and 102', a driver 104, pick-off sensors 105 and 105', and flow conduits 103A and 103B. The driver 104 and the pick-off sensors 105 and 105' are connected to the flow conduits 103A and 103B.

The flanges 101 and 101' are affixed to the manifolds 102 and 102'. The manifolds 102 and 102' can be affixed to opposite ends of a spacer 106 in some embodiments. The spacer 106 maintains the spacing between the manifolds 102 and 102' in order to prevent pipeline forces from being transmitted to flow conduits 103A and 103B. When the flowmeter assembly 10 is inserted into a pipeline (not shown) which carries the flow fluid being measured, the flow fluid enters the flowmeter assembly 10 through the flange 101, passes through the inlet manifold 102 where the total amount of flow fluid is directed to enter the flow conduits 103A and 103B, flows through the flow conduits 103A and 103B and back into the outlet manifold 102', where it exits the meter assembly 10 through the flange 101'.

The flow fluid can comprise a liquid. The flow fluid can comprise a gas. The flow fluid can comprise a multi-phase fluid, such as a liquid including entrained gases and/or entrained solids.

The flow conduits 103A and 103B are selected and appropriately mounted to the inlet manifold 102 and to the outlet manifold 102' so as to have substantially the same mass distribution, moments of inertia, and elastic modules about the bending axes W-W and W'-W' respectively. The flow conduits 103A and 103B extend outwardly from the manifolds 102 and 102' in an essentially parallel fashion.

The flow conduits 103A and 103B are driven by the driver 104 in opposite directions about the respective bending axes W and W' and at what is termed the first out of phase bending mode of the vibratory flowmeter 5. The driver 104 may comprise one of many well known arrangements, such as a magnet mounted to the flow conduit 103A and an opposing coil mounted to flow conduit 103B. An alternating current is passed through the opposing coil to cause both conduits to oscillate. A suitable drive signal is applied by the meter electronics 20 to the driver 104 via the lead 110. Other driver devices are contemplated and are within the scope of the description and claims.

The meter electronics 20 receives sensor signals on the leads 111 and 111', respectively. The meter electronics 20 produces a drive signal on the lead 110 which causes the driver 104 to oscillate the flow conduits 103A and 103B. Other sensor devices are contemplated and are within the scope of the description and claims.

The meter electronics 20 processes the left and right velocity signals from the pick-off sensors 105 and 105' in order to compute a flow rate, among other things. The communication path 26 provides an input and an output means that allows the meter electronics 20 to interface with an operator or with other electronic systems. The description of FIG. 1 is provided merely as an example of the operation of a vibratory flowmeter, such as a Coriolis flowmeter, and is not intended to limit the teaching of the present invention.

The meter electronics 20 in one embodiment is configured to vibrate the flowtubes 103A and 103B. The vibration is performed by the driver 104. The meter electronics 20 further receives resulting vibrational signals from the pickoff sensors 105 and 105'. The vibrational signals comprise a vibrational response of the flowtubes 103A and 103B. The meter electronics 20 processes the vibrational response and determines a response frequency and/or phase difference. The meter electronics 20 processes the vibrational response and determines one or more flow measurements, including a mass flow rate and/or density of the flow fluid. Other vibrational response characteristics and/or flow measurements are contemplated and are within the scope of the description and claims.

In one embodiment, the flowtubes 103A and 103B comprise substantially U-shaped flowtubes, as shown. Alternatively, in other embodiments, the flowtubes can comprise substantially Y-shaped or straight flowtubes. Additional flowmeter shapes and/or configurations can be used and are within the scope of the description and claims.

Figure 2:
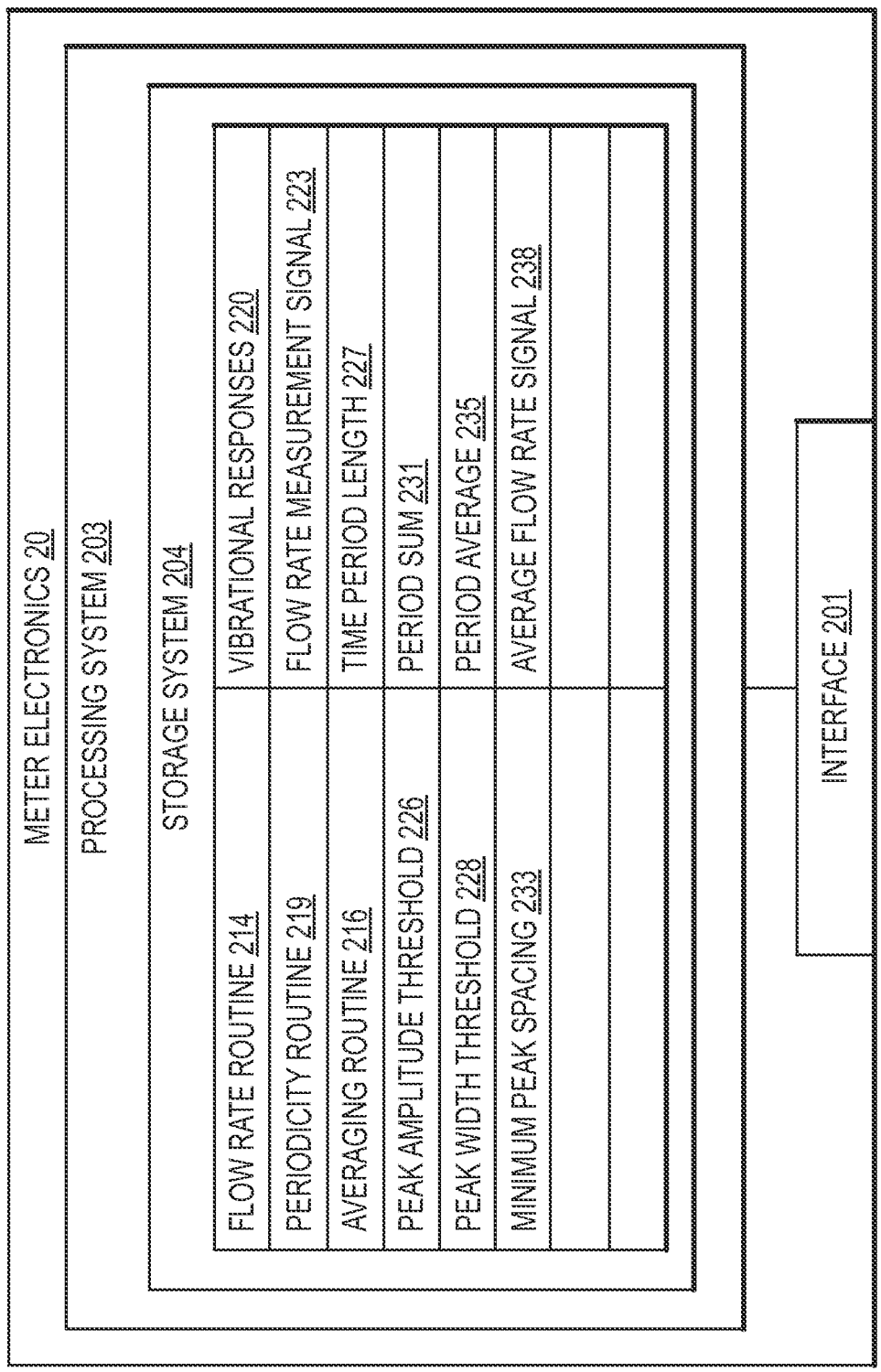
FIG. 2 shows meter electronics of the vibratory flowmeter according to an embodiment of the invention.

FIG. 2 shows meter electronics 20 of the vibratory flowmeter 5 according to an embodiment of the invention. The meter electronics 20 can include an interface 201 and a processing system 203. The meter electronics 20 receives first and second sensor signals from the meter assembly 10, such as pickoff/velocity sensor signals. The meter electronics 20 processes the first and second sensor signals in order to obtain flow characteristics of the flow material flowing through the meter assembly 10. For example, the meter electronics 20 can determine one or more of a phase difference, frequency, time difference ($\Delta t$), density, mass flow rate, and/or volume flow rate from the sensor signals, for example. The meter electronics 20 can generate a flow rate measurement signal 223. The meter electronics 20 can generate a substantially average flow rate signal 238. In addition, other flow characteristics can be determined according to the invention.

The interface 201 receives the sensor signals from one of the velocity sensors 170L and 170R via the leads 100 of FIG. 1. The interface 201 can perform any necessary or desired signal conditioning, such as any manner of formatting, amplification, buffering, etc. Alternatively, some or all of the signal conditioning can be performed in the processing system 203.

In addition, the interface 201 can enable communications between the meter electronics 20 and external devices. The interface 201 can be capable of any manner of electronic, optical, or wireless communication.

The interface 201 in one embodiment includes a digitizer (not shown), wherein the sensor signal comprises an analog sensor signal. The digitizer samples and digitizes the analog sensor signal and produces a digital sensor signal. The interface/digitizer can also perform any needed decimation, wherein the digital sensor signal is decimated in order to reduce the amount of signal processing needed and to reduce the processing time.

The processing system 203 conducts operations of the meter electronics 20 and processes flow measurements from the flow meter assembly 10. The processing system 203 executes one or more processing routines and thereby processes the flow measurements in order to produce one or more flow characteristics.

The processing system 203 can comprise a general purpose computer, microprocessor, logic circuit, or other general purpose or customized processing device. The processing system 203 can be distributed among multiple processing devices. The processing system 203 can include any manner of integral or independent electronic storage medium, such as the storage system 204.

In the embodiment shown, the processing system 203 receives the sensor signals from the flow meter assembly 10, stores the sensor signals at least temporarily as two or more vibrational responses 220, and generates various flow measurements from the two or more vibrational responses 220. The processing system 203 can generate a flow rate measurement signal 223 from the two or more vibrational responses 220. The flow rate measurement signal 223 can comprise an instantaneous mass flow rate or an instantaneous volumetric flow rate. The processing system 203 can generate an average flow rate signal 238 from the flow rate measurement signal 223. The average flow rate signal 238 can comprise an average mass flow rate or an average volumetric flow rate. The processing system 203 can store, display, log, and/or transmit the flow rate measurement signal 223 and the average flow rate signal 238.

The storage system 204 can store routines that are executed by the processing system 203. In some embodiments, the storage system 204 stores a flow rate routine 214 for generating the flow rate measurement signal 223. In some embodiments, the storage system 204 stores a periodicity routine 219 for determining flow peaks, flow peak locations, and time spans (i.e., periods) between peaks. In some embodiments, the storage system 204 stores an averaging routine 216 that generates the average flow rate signal 238 from the flow rate measurement signal 223.

In one embodiment, the storage system 204 may store variables used to operate the vibratory flowmeter 5 and may store values generated by the meter electronics 20. The storage system 204 may store flow characteristics generated from the flow measurements.

The storage system 204 may store the two or more vibrational responses 220 received from the velocity/pickoff sensors 170L and 170R. The two or more vibrational responses 220 may comprise two or more sequences of time-varying digital measurement values.

The storage system 204 may store a time period length 227. The time period length 227 may comprise a time span between consecutive peaks (or between consecutive positive or negative peaks), such as the time span between a current flow peak and a previous flow peak, for example. It should be understood that the time period length 227 may store more than one length value and may store multiple length values. It should be further understood that the time period lengths may vary with changes in the flow.

The storage system 204 may store a period sum 231. The period sum 231 may comprise a sum of flow rate amplitude values for a particular time period. It should be understood that the period sum 231 may store more than one sum, corresponding to more than one time period.

The storage system 204 may store a period average 235. The period average 235 comprises a computed average flow rate value for a particular time period. It should be understood that the period average 235 may store more than one average, corresponding to more than one time period.

The storage system 204 may store the average flow rate signal 238. The average flow rate signal 238 may comprise a series or sequence of period averages. The series of period averages are generated for a series of successive time periods or windows. The series of period averages become the average flow rate signal 238 when added to the average flow rate signal 238 in a time-wise order.

The storage system 204 may store a predetermined peak amplitude threshold 226. The peak amplitude threshold 226 may comprise a minimum flow rate amplitude that is required for a flow rate artifact to be judged a flow peak.

The storage system 204 may store a predetermined peak width threshold 228. The peak width threshold 228 may comprise a minimum peak width that is required for a flow rate artifact to be judged a flow peak. In addition, or alternatively, the peak width threshold 228 may comprise a maximum peak width that is required for a flow rate artifact to be judged a flow peak. In another alternative, the peak width threshold 228 may comprise a peak width range that must be satisfied for a flow rate artifact to be judged a flow peak.

The storage system 204 may store a predetermined minimum peak spacing 233. The predetermined minimum peak spacing 233 comprises a minimum time-wise spacing between successive or adjacent flow peaks. In some embodiments, a current flow peak must be spaced apart from a previous peak by the predetermined minimum peak spacing 233 in order to be judged to be a flow peak for the purpose of averaging. This may prevent multiple peaks from being judged as next flow peaks, such as the multiple peak shown at the center of the graph in FIG. 4C.

The meter electronics 20, when executing the flow rate routine 214, is configured to generate an average flow rate signal. The meter electronics 20, when executing the flow rate routine 214, may further execute the periodicity routine 219 and/or the averaging routine 216. The meter electronics 20, when executing the flow rate routine 214, is configured to receive the at least two vibrational signals and generate a flow rate measurement signal, divide the flow rate measurement signal into a series of time periods, with each time period including a single flow peak that is substantially centered in the time period, totalize flow rate measurements of each time period to generate a period sum, and divide the period sum by a time period length to generate a period average flow rate. Finally, the meter electronics 20 outputs a sequence of period average flow rates as the average flow rate signal. In some embodiments, the average flow rate signal comprises an average mass flow rate signal. Alternatively, the average flow rate signal may comprise an average volumetric flow rate signal.

In some embodiments, the time period length may be fixed or substantially constant. Alternatively, the time period length may be adaptive and may change as the flow being measured changes.

In some embodiments, the meter electronics 20 may be configured to determine periodicity in the flow rate measurement signal. The periodicity may be determined by performing a discrete Fourier transform (DFT) on the flow rate measurement signal. The DFT can be used to produce a frequency-domain spectrum, wherein the periodicity of the flow peaks can be determined from the spectrum.

In one embodiment, the periodicity may be determined by scanning for peaks in the flow rate measurement signal. The scanning may include comparing signal amplitudes, widths, and spacings to predetermined values or ranges. In some embodiments the scanning may comprise the meter electronics 20 comparing flow artifacts in the flow rate measurement signal to one or more of a predetermined peak amplitude threshold 226, a predetermined peak width threshold 228, or a predetermined minimum peak spacing threshold 233. Only the flow artifacts that satisfy the predetermined values are judged to be determined flow peaks. In this manner, smaller flow anomalies, such as the low spike shown in FIG. 4E, will not be judged to be flow peaks. Such smaller flow anomalies may affect the averaging process by dividing up the flow rate measurement signal into very short duration time periods, driving up the processing time and processing load.

The periodicity may be determined by performing a windowing analysis on the flow rate measurement signal. A windowing analysis comprises processing the flow rate measurement signal using multiple time windows or a sliding window. In windowing, the window is periodically moved to a next location and the signal within the boundaries of the window is processed to generate an amplitude peak indication. Then the window is moved to a next location and the processing is repeated. The contents of a window may be processed to determine a point in time of maximum amplitude or energy content. The windows may overlap or may be distinct. The processing may generate an indication of maximum signal amplitude for each window, wherein a series of windows will generate information that may allow determination of all ascertainable flow peaks in the flow rate measurement signal.

Figure 3A:
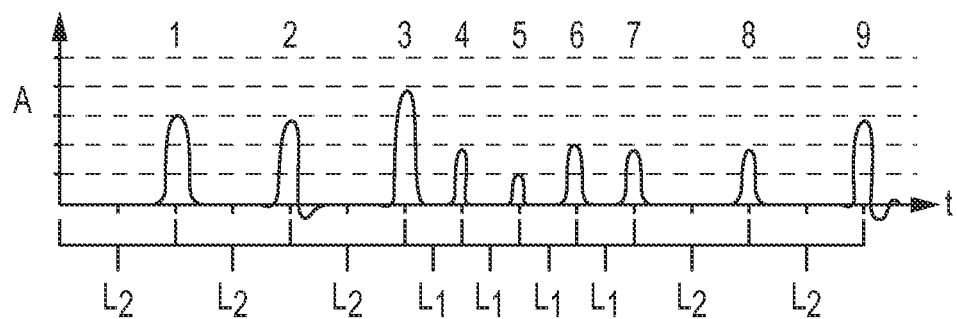
FIGS. 3A-3C show representative processing steps for a pulsating flow according to an embodiment of the invention.
Figure 3B:
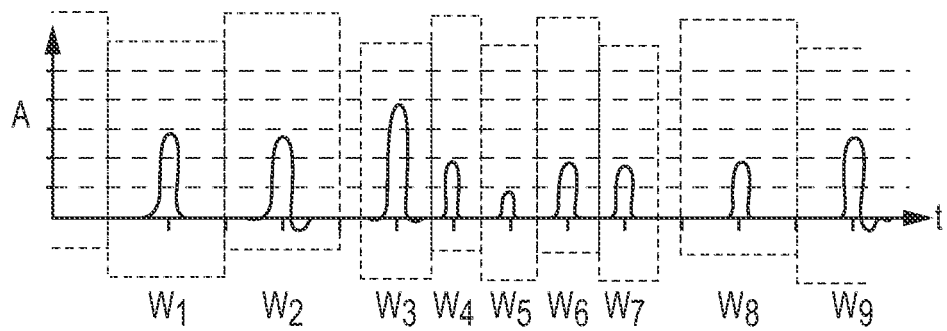
Figure 3C:
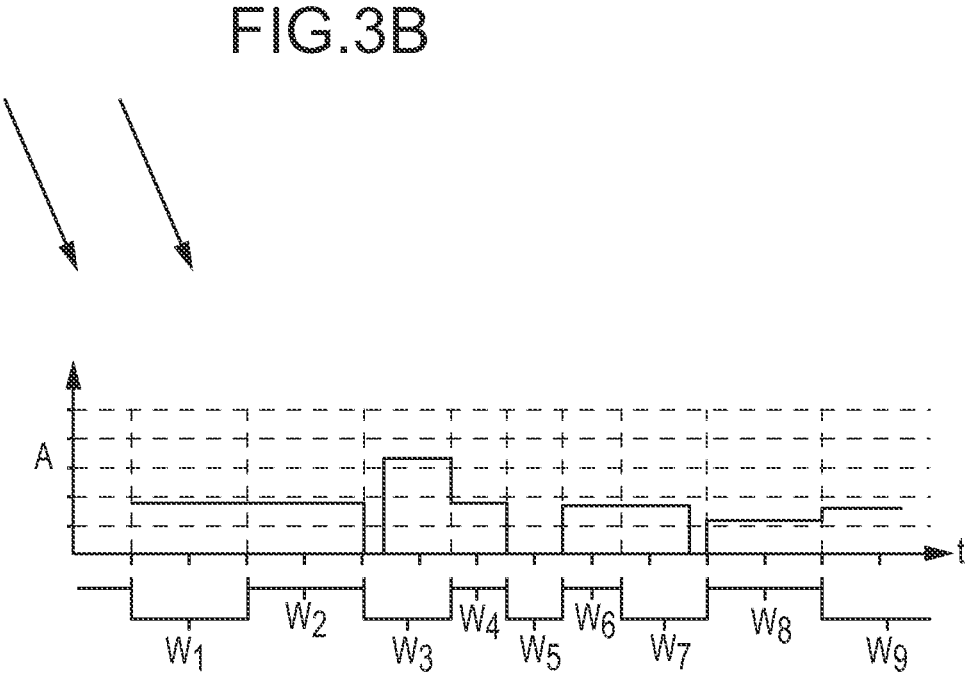

FIGS. 3A-3C show representative processing steps for a pulsating flow according to an embodiment of the invention. FIG. 3A shows a representative pulsating flow, including flow peaks of differing amplitudes and flow peaks at varying time separations. FIG. 3A also comprises a flow rate measurement signal. The first three flow peaks are spaced apart by time period lengths of $L_2$. The following four flow peaks are spaced apart by time period lengths of $L_1$. The final two flow peaks are spaced apart by time period lengths of $L_2$. The first, second, and ninth flow peaks have an amplitude of three. The third peak has an amplitude of four. The fourth, sixth, seventh, and eight flow peaks have an amplitude of two. The fifth flow peak has an amplitude of one.

FIG. 3B shows the flow of FIG. 3A after periodicity has been determined and the signal has been divided up into a series of time periods. It should be noted that each flow peak is substantially centered in its time period. The first, second, and eighth time periods or windows $W_1$, $W_2$, and $W_8$ have lengths $L_2$. The third, fourth, fifth, sixth, and seventh time periods $W_3$-$W_7$ have lengths $L_1$.

It should be noted that in the example shown the time periods $W_3$ and $W_7$ are not contiguous with the neighboring periods $W_2$ and $W_8$. However, they could be configured to extend to neighboring periods $W_2$ and $W_8$ if desired. Alternatively, the periods can overlap.

FIG. 3C comprises an average flow rate signal as derived from the flow rate measurement signal. Each of the flow peaks in the periods $W_1$-$W_9$ of FIG. 3B have been replaced with corresponding period averages. It should be noted that the arrows between FIG. 3B and FIG. 3C denote a processing delay in producing the average flow rate signal of FIG. 3C from the flow rate measurement signal as shown in FIGS. 3A-3B.

The flow peak in period $W_5$ in this example has been judged to have insufficient amplitude to comprise a flow peak for the purpose of averaging. For example, the amplitude value may have been compared to the peak amplitude threshold 226 and been less than the threshold. As a result, the time period $W_5$ may have a period average of zero, as shown. Alternatively, the flow rate artifact in time period $W_5$ may be included in one or both of the adjacent periods $W_4$ and $W_6$ (but offset from the center of the period).

In another alternative, the periodicity processing may compare flow rate artifacts to the peak amplitude threshold 226 and judge the small peak as not being large enough to comprise a period endpoint, whereupon the small peak would be included in either the previous period $W_4$ or in the following period $W_6$.

The period average of period $W_8$ is shown to be less than that of period $W_7$, even though the amplitude of the flow peak in period $W_8$ is the same as the flow peak amplitude in period $W_7$. This is because the period $W_8$ has a length $L_2$ that is greater than the length $L_1$ of the period $W_7$.

Similarly, the period average in period $W_3$ is larger than the period average of period $W_2$. This is due to both a greater peak amplitude and a lesser period length in period $W_3$ than in period $W_2$.

Figure 4A:
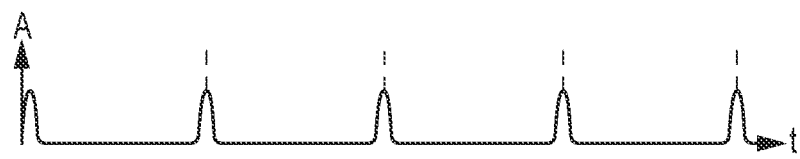
FIGS. 4A-4E show examples of various pulsating flows.

FIGS. 4A-4E show examples of various pulsating flows. FIG. 4A shows an example of a pulsating flow measurement that includes regularly spaced flow measurement peaks. The flow peaks are substantially identical in this example, and occur at substantially regular and predictable periodic intervals. As a result, the generation of an average flow rate for this flow rate measurement waveform will be straightforward.

Figure 4B:
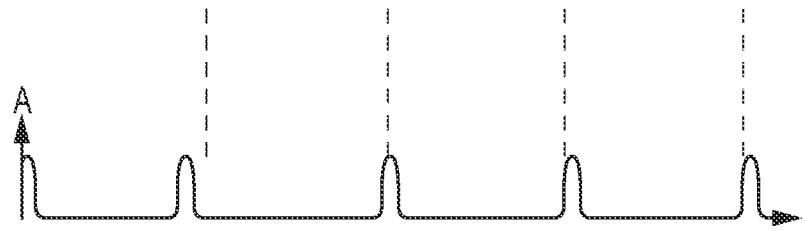

FIG. 4B comprises a pulsating flow where the second pulse is early (compared to the waveforms above and below). Such a change in periodicity from one peak to the next will affect an average flow rate value. Depending on the averaging process, such an off-period flow peak, when measured in the prior art, may create an average flow rate output value that experiences large transitions if the averaging operates over fixed periods. For example, the second pulse could be averaged in with the first pulse, resulting in an artificially boosted average value in the first period, and with a subsequent artificially decreased average value in the following time period.

Figure 4C:
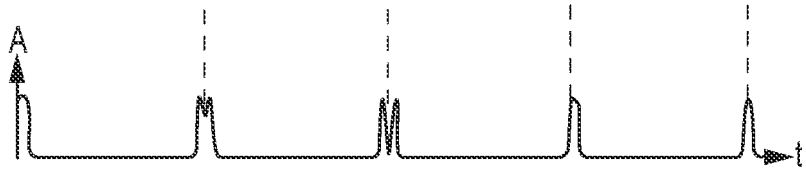

FIG. 4C comprises a pulsating flow where the peaks are not uniform. In some cases, a peak may include a partial dip or may comprise multiple partial peaks. This may complicate determining the periodicity of the pulsating flow.

Figure 4D:
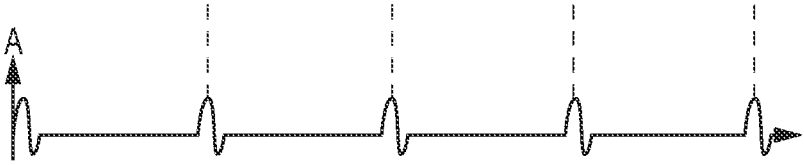

FIG. 4D comprises a pulsating flow where the peaks include portions that dip below the horizontal (or zero flow amplitude) axis. These flow measurement dips comprise instances of reverse or negative flow. Again, the negative flow may complicate the process of determining the periodicity of the pulsating flow. Further, the negative flow may make an averaging uneven and rough in nature.

Figure 4E:
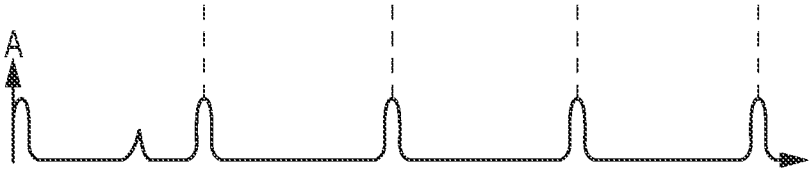

FIG. 4E comprises a pulsating flow where extra peaks occur between periodic flow peaks. This may be due to the flow meter environment, including the opening or closing of valves, feedback or regulation of the pump, surges or drops in pressure not due to a pump, or other causes. The irregular nature of such spikes may improperly affect an average value if the small spike is judged to be a flow peak, with the periodicity of the signal therefore being affected.

Figure 5:
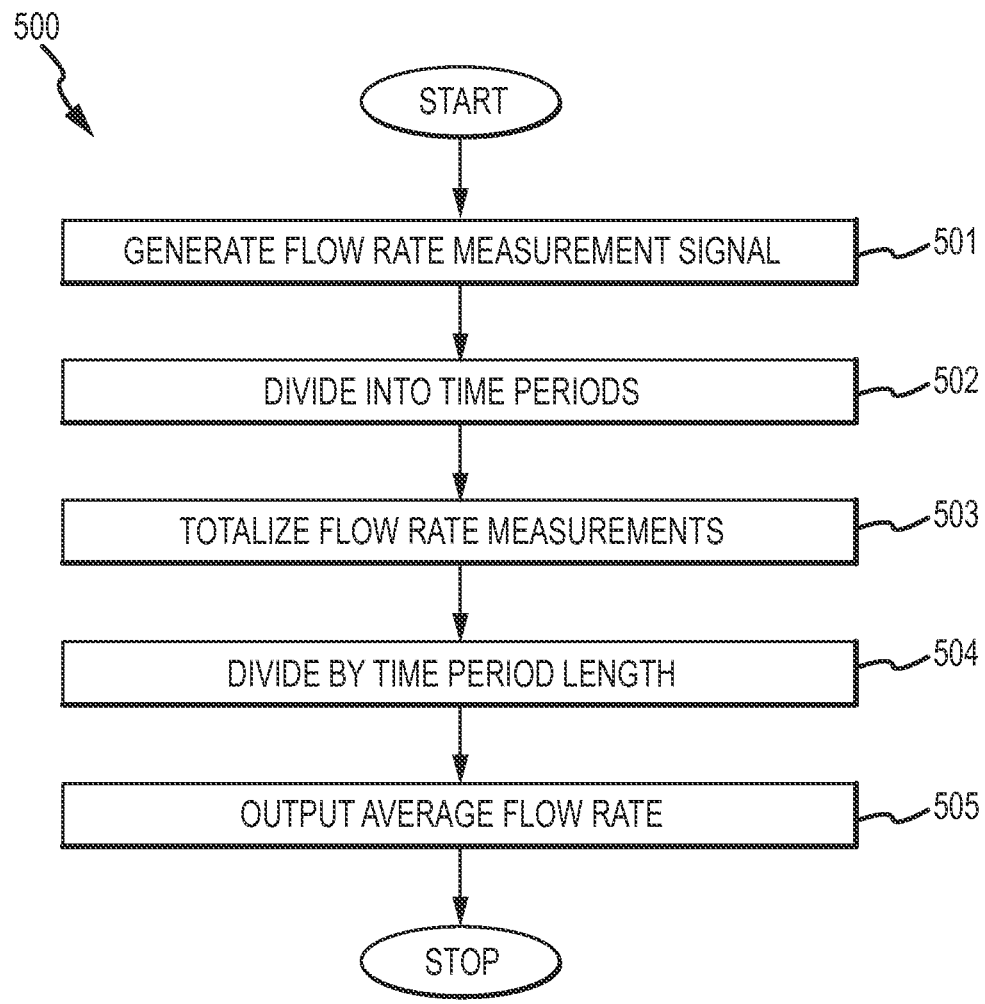
FIG. 5 is a flowchart of a method for determining an average flow rate of a pulsating flow according to an embodiment of the invention.

FIG. 5 is a flowchart 500 of a method for determining an average flow rate of a pulsating flow according to an embodiment of the invention. In step 501, a vibratory flowmeter generates a flow rate measurement signal. The vibratory flowmeter uses two or more vibrational signals to generate the flow rate measurement signal. The two or more vibrational signals may be processed to determine a phase difference between two or more spaced-apart pickoff sensor locations on a vibrating flowtube or flowtubes, as is known in the art. The phase difference is used to generate the flow rate measurement signal. In addition, other values, constants, or data may also be used in generating the flow rate measurement signal, as is known in the art. The flow rate measurement signal will vary in time and will substantially instantaneously track the flow of the flow material through the meter.

In step 502, a periodicity processing determines flow peaks and the time periods between the determined flow peaks. Subsequently, the flow rate measurement signal is divided into the determined sequence of time periods (see FIG. 3B). The time periods may be substantially uniform, but may vary according to a periodicity of the flow. The time periods may overlap or may be substantially distinct. The time periods may comprise periods of length corresponding to the chronological separations between ascertainable flow peaks. The flow peaks can comprise positive or negative peaks. By determining the periodicity of the signal and the time spans between flow peaks, and averaging the flow rate measurement signal according to the flow peak periods, the produced period averages are more representative of a pulsating flow. Further, the produced period averages may comprise averages computed for flow peak periods of varying lengths.

The time periods are configured so that they preferably include only one flow peak or flow peak group per time period. Alternatively, the time periods may be configured so that they include only one flow peak or flow peak group of a magnitude greater than a predetermined magnitude threshold.

The time periods are configured so that they preferably are substantially centered about a particular flow peak or flow peak group. By centering each flow peak in a corresponding time period, the produced period averages are more representative of a pulsating flow.

The periodicity process may require that a flow artifact satisfy the predetermined peak amplitude threshold 226. A flow peak may be compared to the predetermined peak amplitude threshold 226 in order to determine whether the flow peak comprises a peak for purposes of the averaging. A flow peak that exceeds the predetermined peak amplitude threshold 226 may be judged to comprise a determined flow peak. The judging may comprise judging on the predetermined peak amplitude threshold 226 alone, or may be combined with judging other aspects of the flow artifact, including a peak width and peak spacing, as discussed below.

The periodicity processing may require that a flow artifact satisfy the predetermined peak width threshold 228. The predetermined peak width threshold 228 may comprise a minimum peak width. The predetermined peak width threshold 228 may also comprise a maximum peak width. Further, the predetermined peak width threshold 228 may comprise a peak width range, wherein a flow artifact is judged to be a determined flow peak only if the flow artifact satisfies a peak width range, for example.

The periodicity processing may require that a flow artifact satisfy the predetermined minimum peak spacing 233. The predetermined minimum peak spacing 233 comprises a minimum time-wise spacing between successive or adjacent flow peaks. The periodicity processing may require that a current flow peak be spaced apart from a previous peak by the predetermined minimum peak spacing 233 in order to be judged to be a flow peak for the purpose of averaging. This may prevent multiple peaks, such as the multiple peak shown at the center of the graph in FIG. 4C, from being judged as a next flow peak.

Other periodicity characteristics are contemplated and are within the scope of the description and claims. Likewise, other signal peak characteristics are contemplated and are within the scope of the description and claims.

The periodicity may be determined by using a discrete Fourier Transform (DFT), as previously discussed. The periodicity may be determined by scanning for peaks, as previously discussed. The periodicity may be determined by a windowing analysis, as previously discussed.

In step 503, the flow rate measurements for each time period are totaled, producing a period sum for a particular time period. The flow rate measurements may be totalized in any suitable fashion. For example, where the flow rate measurements comprise a digital signal, the totalizing can comprise summing up a series of amplitude values or time-wise bin values for a particular window.

In step 504, each period sum is divided by the corresponding time period length. The dividing produces a period average flow rate for the time period. Each period average flow rate thus produced will lag the actual flow. However, each period average flow rate may advantageously lag the actual flow by only about one time period, in some embodiments. Consequently, the synchronicity of the average flow rate signal to the actual fluid flow can be changed by decreasing the time period length, if desired. However, wherein the time period length is adaptively changed to track the spacing between ascertainable flow peaks, the time period length will autonomously decrease where the frequency/spacing of flow peaks increases/where the spacing of flow peaks decreases. The result is that the relative coarseness or fineness of the average flow rate signal will adaptively change according to changes in the pulsating flow.

In step 505, an average flow rate signal is outputted. The average flow rate signal comprises a sequence of period average flow rates. The sequence of period average flow rates comprises an average flow rate for the flowing fluid, with the average flow rate being substantially synchronous with changes in the flow.

The vibratory flowmeter and method according to the invention can be employed according to any of the embodiments in order to provide several advantages, if desired. The vibratory flowmeter and method according to any of the embodiments may better handle pulsating flows. The vibratory flowmeter and method according to any of the embodiments may generate a more accurate and reliable average flow rate. The vibratory flowmeter and method according to any of the embodiments may generate an average flow rate that updates rapidly. The vibratory flowmeter and method according to any of the embodiments may generate an average flow rate that minimally lags the instantaneous flow rate.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention. Accordingly, the scope of the invention should be determined from the following claims.

What is claimed is:

1. A vibratory flowmeter (5) for determining an average flow rate of a pulsating flow, the vibratory flowmeter (5) comprising:
   a flowmeter assembly (10) including at least two pickoff sensors (170L, 170R) and configured to generate at least two vibrational signals; and
   meter electronics (20) configured to receive the at least two vibrational signals and generate a flow rate measurement signal, divide the flow rate measurement signal into a series of time periods, with each time period including a single flow peak that is substantially centered in the time period, totalize flow rate measurements of each time period to generate a period sum, and divide the period sum by a time period length to generate a period average flow rate, wherein the meter electronics (20) outputs a sequence of period average flow rates as an average flow rate signal.

2. The vibratory flowmeter (5) of claim 1, with the average flow rate signal comprising an average mass flow rate signal.

3. The vibratory flowmeter (5) of claim 1, with the average flow rate signal comprising an average volumetric flow rate signal.

4. The vibratory flowmeter (5) of claim 1, wherein the time period length is substantially fixed.

5. The vibratory flowmeter (5) of claim 1, wherein the time period length is adaptive.

6. The vibratory flowmeter (5) of claim 1, with the meter electronics (20) being configured to determine periodicity in the flow rate measurement signal.

7. The vibratory flowmeter (5) of claim 1, with the meter electronics (20) being configured to determine periodicity in the flow rate measurement signal, wherein the periodicity is determined by performing a discrete Fourier transform (DFT) on the flow rate measurement signal.

8. The vibratory flowmeter (5) of claim 1, with the meter electronics (20) being configured to determine periodicity in the flow rate measurement signal, wherein the periodicity is determined by scanning for peaks in the flow rate measurement signal.

9. The vibratory flowmeter (5) of claim 1, with the meter electronics (20) being configured to determine periodicity in the flow rate measurement signal, wherein the periodicity is determined by scanning for peaks in the flow rate measurement signal, with the scanning comprising the meter electronics (20) comparing flow artifacts in the flow rate measurement signal to one or more of a predetermined peak amplitude threshold (226), a predetermined peak width threshold (228), or a predetermined minimum peak spacing threshold (233).

10. The vibratory flowmeter (5) of claim 1, with the meter electronics (20) being configured to determine periodicity in the flow rate measurement signal, wherein the periodicity is determined by performing a windowing analysis on the flow rate measurement signal.

11. A method for determining an average flow rate of a pulsating flow, the method comprising:
receiving two or more vibrational response signals from two or more pickoff sensors of a vibratory flowmeter and generating a flow rate measurement signal;
dividing the flow rate measurement signal into a series of time periods, with each time period including a single flow peak that is substantially centered in the time period;
totalizing flow rate measurements of each time period to generate a period sum; and
dividing the period sum by a time period length to generate a period average flow rate, wherein a sequence of period average flow rates is outputted as an average flow rate signal.

12. The method of claim 11, with the average flow rate signal comprising an average mass flow rate signal.

13. The method of claim 11, with the average flow rate signal comprising an average volumetric flow rate signal.

14. The method of claim 11, wherein the time period length is substantially fixed.

15. The method of claim 11, wherein the time period length is adaptive.

16. The method of claim 11, with dividing the flow rate measurement signal into a series of time periods comprising determining periodicity in the flow rate measurement signal.

17. The method of claim 11, with dividing the flow rate measurement signal into a series of time periods comprising determining periodicity in the flow rate measurement signal, wherein the periodicity is determined by performing a discrete Fourier transform (DFT) on the flow rate measurement signal.

18. The method of claim 11, with dividing the flow rate measurement signal into a series of time periods comprising determining periodicity in the flow rate measurement signal, wherein the periodicity is determined by scanning for peaks in the flow rate measurement signal.

19. The method of claim 11, with dividing the flow rate measurement signal into a series of time periods comprising determining periodicity in the flow rate measurement signal, wherein the periodicity is determined by scanning for peaks in the flow rate measurement signal, with the scanning comprising comparing flow artifacts in the flow rate measurement signal to one or more of a predetermined peak amplitude threshold, a predetermined peak width threshold, or a predetermined minimum peak spacing threshold.

20. The method of claim 11, with dividing the flow rate measurement signal into a series of time periods comprising determining periodicity in the flow rate measurement signal, wherein the periodicity is determined by performing a windowing analysis on the flow rate measurement signal.

* * * * *